United States Patent
Zimowski

(10) Patent No.: US 8,010,582 B2
(45) Date of Patent: Aug. 30, 2011

(54) METHOD, SYSTEM, AND PROGRAM PRODUCT FOR MIGRATING DATA FROM ONE DATA BASE MANAGEMENT SYSTEM TO ANOTHER DATA BASE MANAGEMENT SYSTEM

(75) Inventor: Melvin Richard Zimowski, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 12/473,070

(22) Filed: May 27, 2009

(65) Prior Publication Data
US 2009/0240704 A1    Sep. 24, 2009

Related U.S. Application Data

(63) Continuation of application No. 10/102,385, filed on Mar. 18, 2002, now abandoned.

(51) Int. Cl.
*G06F 17/30* (2006.01)
(52) U.S. Cl. .................................. 707/809; 707/803
(58) Field of Classification Search .............. 707/635, 707/803, 809, 999.1, 104.1, 202, 204
See application file for complete search history.

(56) References Cited

U.S. PATENT DOCUMENTS

| | | |
|---|---|---|
| 5,678,044 A | 10/1997 | Pastiha et al. |
| 5,761,667 A | 6/1998 | Koeppen |
| 5,890,159 A | 3/1999 | Sealby et al. |
| 5,899,990 A | 5/1999 | Maritzen et al. |
| 5,937,415 A | 8/1999 | Sheffield et al. |
| 6,016,501 A | 1/2000 | Martin et al. |
| 6,029,178 A | 2/2000 | Martin et al. |
| 6,035,307 A | 3/2000 | Martin et al. |
| 6,092,086 A | 7/2000 | Martin et al. |
| 6,115,704 A | 9/2000 | Olson et al. |
| 6,115,722 A | 9/2000 | Isip, Jr. et al. |
| 6,151,602 A | 11/2000 | Hejlsberg et al. |
| 6,151,608 A * | 11/2000 | Abrams ................. 707/679 |
| 6,167,405 A | 12/2000 | Rosensteel et al. |
| 6,170,045 B1 | 1/2001 | Bobak et al. |
| 6,219,660 B1 | 4/2001 | Haderle et al. |
| 6,219,662 B1 | 4/2001 | Fuh et al. |
| 6,490,590 B1 | 12/2002 | Fink |

(Continued)

FOREIGN PATENT DOCUMENTS

JP    2000029891    1/2000

(Continued)

OTHER PUBLICATIONS

"Datajoiner: A Multidatabase Server Version 1", IBM Corporation, White Paper, May 1995, pp. 1-18.*

(Continued)

*Primary Examiner* — Debbie Le
(74) *Attorney, Agent, or Firm* — Sughrue Mion, PLLC

(57) ABSTRACT

A method, system, and program product to migrate data from a data table in a data source to a data table in a target. This is done initiating processes, typically two parallel batch processes, with one of the processes unloading the data from the data source and uploading the data into the data target, and the other of the processes loading the source data into a database at the data target. Preferably the processes are parallel batch process. The processes are initiated from the data target.

23 Claims, 1 Drawing Sheet

U.S. PATENT DOCUMENTS

| | | | |
|---|---|---|---|
| 6,567,823 | B1 | 5/2003 | Rothschild |
| 6,643,671 | B2 | 11/2003 | Milillo et al. |
| 6,789,096 | B2 | 9/2004 | Sankaran et al. |
| 7,251,747 | B1 * | 7/2007 | Bean et al. .................. 714/18 |
| 2001/0013038 | A1 | 8/2001 | Purcell |
| 2002/0161748 | A1 | 10/2002 | Hamel et al. |

FOREIGN PATENT DOCUMENTS

| | | |
|---|---|---|
| JP | 2000029898 | 1/2000 |

OTHER PUBLICATIONS

Jang et al., "An Extended Model for Intergration between the Oracle DBMS and WWW", International Conference on Information and Communications and Signal Processing, ICICS '97, Singapore, Sep. 9-12, 1997, pp. 569-572.

* cited by examiner

METHOD, SYSTEM, AND PROGRAM PRODUCT FOR MIGRATING DATA FROM ONE DATA BASE MANAGEMENT SYSTEM TO ANOTHER DATA BASE MANAGEMENT SYSTEM

The present application is a Continuation of U.S. application Ser. No. 10/102,385, filed Mar. 18, 2002. The entire disclosure which is hereby incorporated by reference.

FIELD OF THE INVENTION

The method, system, and program product described herein are used for migrating large volumes of data from a data source to a data target, and include organizing and inter-relating data or files, e.g., providing an association between different schema and metadata, with, for example, data structure conversion, for optimization of database and file migration and storage, and for data compatibility between different or multiple databases.

BACKGROUND OF THE INVENTION

Current approaches for migrating large quantities (for example, gigabytes) of data from relational data stores on various database platform sources, such as Windows NT, AIX, Linux, Solaris, and other database platforms, to databases on disparate target platforms, such as IBM "DB2 UDB for OS/390," do not perform well and are overly complex. Poor performance and complexity can be attributed to a variety of causes including (1) using SQL in a multi-step process to both extract the data from the source data store and place the data into the target data store, (2) storing the data in one or more intermediate data stores (e.g. local file systems) during data migration, (3) performing multiple datatype conversions as the data is moved between environments, (4) using less efficient and inefficient data transfer mechanisms, and (5) using data migration processes that are not fully automated.

SUMMARY OF THE INVENTION

The method, system, and program product described herein use bulk data loading interfaces to migrate the source data into a target data store. The method, system, and program product of the invention eliminate the use of intermediate data stores on the target system, execute the extraction of the data from the source data store and the placement of the data into the target data store in parallel, minimize the datatype conversions that are performed, transfer the data in large blocks, and perform the migration in a fully automated fashion. This approach reduces the complexity and the elapsed time required for performing these types of data migrations.

Specifically, the method, system, and program product migrates data from a relational table in a data source to a relational table in a data target. This is accomplished through the use of two parallel batch processes. One of these batch processes unloads the subject data from the data source and uploads the subject data to the data target. The other batch process loads the subject data into the data target. The "unloading" batch process operating on the data source may use an SQL "SELECT * FROM tablename" command to identify the data to be unloaded, where "tablename" is the name of the source relational table. The "loading" batch process operating on the data target may use a LOAD Utility or other bulk data loading mechanism to load the source data into the data target.

The unload of a particular database table at the source and the subsequent load of the database table at the target execute in parallel. The method, system, and program product allow for the parallel unload and load of the database table by eliminating the use of intermediate data files between the two batch processes. Data flows directly from the unload batch process to the load batch process, thereby reducing both the elapsed time and the complexity of the data migration. The method, system, and program product of the invention also permit a write of the data being migrated to disk on the target system, in parallel with the load of the database table. This copy allows the load of the data to be restartable from the last internal load utility checkpoint in the event of a load utility failure.

The method, system, and program product may be used to facilitate migration of disparate source database data, such as Oracle, Sybase, or Microsoft SQL Server, to, for example, IBM "DB2 for OS/390." In some situations data type conversion may be required. For example, Oracle long data may need to be mapped to IBM UDB DB2 varchar data.

Overall, according to the method, system, and program product of the invention, the complexity of generating SQL view mapping structures, generating batch jobs and coordinating and executing the migration task is reduced due to automated processes and tools.

The method, system, and program product of the invention are intended for use in both peer to peer and client server environments.

The program product of the invention is in the form of computer code on suitable media (such as magnetic or optical media that is machine readable for transmission, installation, instantiation, or execution). The code may be in the form of executable code, in the form of code that requires loading to memory for execution, or (physical or electronic) distribution code that requires one or both of decompression and decryption to be executable.

THE FIGURES

Aspects of the invention are illustrated in the FIGURES.

DESCRIPTION OF THE INVENTION

The method, system, and program product described herein provides for the migration of relational tables from a data source to a data target. This is accomplished through the unloading of a particular database table at the data source and subsequent loading of the database table at a data target. Through the use of a data pipe between the parallel batch processes for (1) unloading the source data and (2) loading the target data, the data being migrated never needs an intermediate write to disk on the target, thereby reducing both the elapsed time and the complexity of the data migration.

Figure 1:
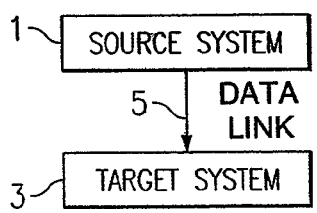
FIG. 1 illustrates a system with two platforms configured for transferring data between the source and the target through a data link.

FIG. 1 illustrates a source-target system configured for transferring data between the data source, 1, and the data target, 3, through a data link, 5. In the data source, 1, SQL identifies the data to be extracted from the source system. The target system initiates the unload of the data at the source system, receives the data, and then loads it into the data target on the target system. It is understood that in a multi-data platform system, there can be more then one data source, and also more then one data target, and that data transfers between the data sources and the data targets may involve data type conversions. Previously, as described above, this was at best, a partially automated and inefficient data transfer system.

Figure 2:
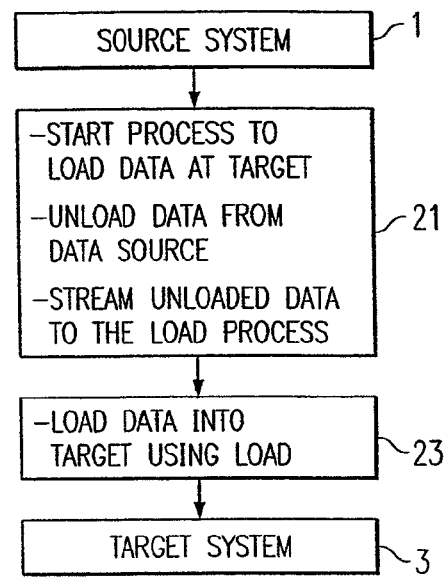
FIG. 2 illustrates the method of transferring data from a data source to a data target, utilizing two target side steps in copying data from the source to the target.

FIG. 2 illustrates the two data target side steps, 21 and 23, used to migrate data from the data source, 1, to the data target, 3. In the first data target side step, 21, the target system, 3, starts the process that will load the data in the second step, uses an unload process to issue an SQL request to unload selective data from the source system, uploads the unloaded data and streams the data to the second step, 23, which, as mentioned earlier, comprises a process that loads the data into the target system.

The two steps, 21 and 23, in FIG. 2, are actually two batch jobs executing on the target system. The first batch job, 21, connects to the source system, issues an SQL statement to retrieve data from a source system table, uploads the selected data, and streams the data to the second batch job, 23 which loads the data into the target system using the DB2 UDB for z/OS Load utility.

Figure 3:
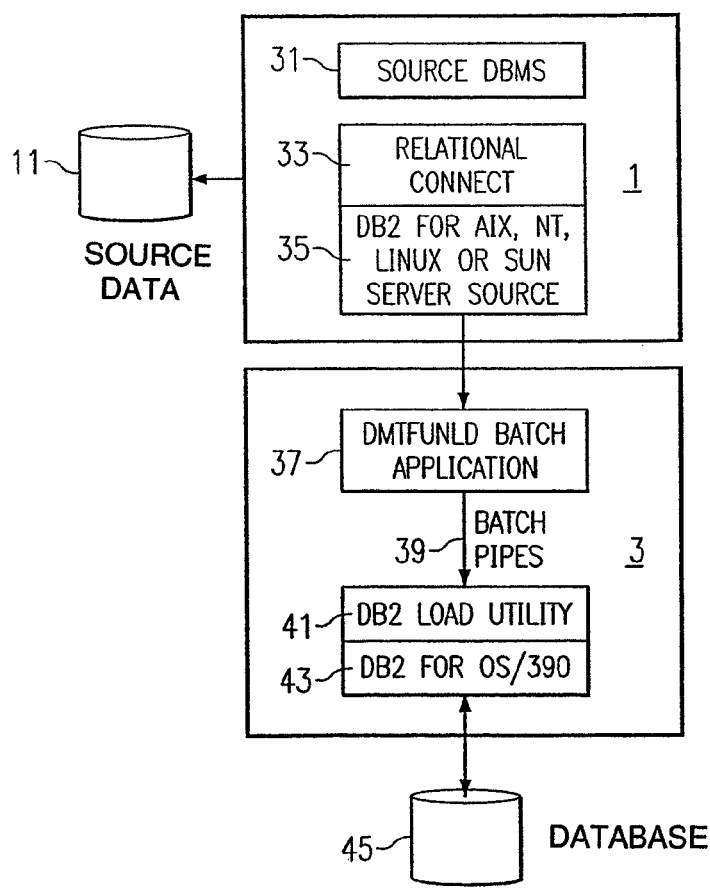
FIG. 3 is a high level illustration of software modules that comprise a preferred embodiment of the method, system, and program product of the invention.

FIG. 3 is a high level illustration of the software modules used to implement the method and system of the invention. The source system, 1, includes source data, 11, a source database management system, 31, for example, a relational database management system, and potentially a middleware product, such as DB2 UDB Relational connect, which allows access to various data sources.

The target system, 3, is associated with a database management system, 43, preferably a relational database management system, an associated database, 45, preferably a relational database, application code to unload and upload data from the data source, and a utility program to load data into the source target.

As illustrated in FIG. 3, there is substantial code execution on the target system, 3. The target system, 3, initiates data transfer from source to target, for example, an IBM DB2 UDB target or similar target, with the application, DMT-FUNLD, 37, which both (1) unloads data from the source table and (2) uploads the data to the target system, 3, using, for example, IBM's Distributed Relational Database Architecture (DRDA) protocol.

DMTFUNLD identifies the data to be unloaded through the execution of an SQL statement. Through the use of DRDA, the SQL statement can be executed against a remote DBMS source, and through the use of DB2 UDB Relational Connect, the remote DBMS source can be one of a variety of DBMS products. The SQL statement issued to unload data from the source DBMS is of the form SELECT * FROM tablename. Once DMTFUNLD issues the SQL statement, the data is uploaded to the target system using DRDA blocking.

DMTFUNLD drives the unload and load processes and executes as a batch program.

DMTFUNLD has the psuedocode representation:

Open the SYSIN dataset and the SYSPUNCH pipe
Read table name from SYSIN dataset
Build the SQL statement to be executed: SELECT * FROM <table_name>
Build the LOAD Utility control statement for the load of the data and write it to SYSPUNCH
Close the SYSPUNCH pipe
Open the SYSREC pipe -continued Execute the SELECT statement to retrieve and upload the data to be migrated and write the data to SYSREC
Close the SYSREC pipe
Close the SYSIN dataset As illustrated in FIG. 3, this batch application unloads the database table from the data source, 11, using middleware, such as Relational Connect, 33, and a relational database management system, such as IBM DB2 UDB, 35. Unloading is initiated using the SQL expression SELECT*FROM tablename.

The method, system, and program product upload the selected data to the data target using Distributed Relational Database Architecture (DRDA) flows, and then generate the LOAD control statement for the load of the extracted table from the source system, 1, into the target system, 3. The load control statement and the unloaded data are passed from DMTFUNLD, 37, to the DB2 LOAD utility, 41, using batch pipes, 39.

To be noted is that the first, 21, and second, 23, batch jobs execute in parallel. The use of batch pipes, 39, permits (i) upload of data from the source system, 1, and (ii) loading of data into the target system, 3, to be substantially simultaneous. The use of batch pipes, 39, also reduces I/O operations and the use of Direct Access Storage Devices (DASD) by transferring data through processor storage rather then through DASD.

Two batch jobs are required for each table to be migrated. The first batch job, 21, performs the unload of the data from one or more tables of the source, 1, and uploads the extracted data to the DB2 for OS/390 server, 43, on the target, 3. For each table, a second batch job performs the load of the data into a DB2 for OS/390 table using the LOAD Utility, 41. The second batch job for each table, 23, is automatically submitted for execution by the first batch job, 21. The first, 21, and second, 23, batch jobs for an individual table execute in parallel. In addition, multiple first batch jobs can execute in parallel. The methodology also includes a process for generating the Job Control Language (JCL) for the batch jobs.

The unload environment on the source data platform, 1, requires special setup and configuration. The system, method, and program product include a process for accomplishing this prior to the execution of the batch jobs that migrate the tables.

The data being migrated always resides in memory and never needs to be written to an intermediate file or any other type of intermediate data store on the target machine, e.g., an IBM OS/390 machine. Source to target datatype conversions, for example, Oracle to DB2 datatype conversions, occur once, at the time the data is unloaded from the source database. The DRDA protocol is used to transfer the data.

The method, system, and program product of the invention also has the capability to create a copy of the data being loaded—in parallel with the execution of the extraction from the source and the load to the target. This copy is useful in situations where the amount of data being migrated is large and the LOAD Utility, 41, for whatever reason, fails to execute to completion, as the copy can be used to restart the load of the data from the last internal LOAD Utility checkpoint rather than from the start of the load. When used, this optional facility does create a copy of the data in an intermediate data store, the local target file system, for example, an IBM OS/390 file system.

The data migration process is initiated by the batch application (DMTFUNLD), 37, that executes under the target's operating system, for example IBM z/OS. Each invocation of the application:
(1) unloads a table from a source database, 11, using, for example, IBM DB2 UDB for AIX with Relational Connect by executing SELECT * FROM tablename,
(2) uploads the table to the target machine using DRDA flows
(3) generates the target machine's LOAD Utility, 41, control statement for the subsequent load of the table into the target machine's database management system, for example, IBM DB2 UDB for OS/390, 43.

The LOAD Utility control statement has the form:
LOAD DATA LOG NO INDDN ddname ENFORCE NO RESUME YES SORTKEYS 150000000 INTO TABLE into_table_specification The batch application passes the LOAD Utility control statement and the data to the target's database management system's LOAD utility using Batch Pipes, 39. The use of Batch Pipes:
(1) permits the upload and the load of the data to proceed in parallel
(2) reduces the number of I/O operations and the use of DASD by transferring data through processor storage rather than to and from DASD The bulk data migration method, system, and program product makes the following assumptions about the source and target schemas:
(1) The source DBMS system and target DBMS system contain identical tables or the source DBMS tables can be mapped to the target DBMS tables using a mechanism such as a relational view.
(2) The source and target tables have the same table and column names.
(3) The datatypes associated with columns of the source and target tables are identical or the datatypes of the source table will be replaced with equivalent target datatypes.

These assumptions permit the existing middleware applications to access the tables that have been migrated to the target system, for example, DB2 for OS/390 tables, and preserve the referential integrity relationships that are introduced and managed by those middleware applications.

EXAMPLE

This example illustrates the creation, modification, and execution of various commands, jobs, and SQL statements used to establish and configure the execution environment for the data migration tool.

The execution environment had the following characteristics:
1. OS/390 Database Server: stplex4a.stl.ibm.com
2. DB2 for OS/390 Subsystem: SBL1 (DB2 for OS/390 V6)
3. Source library for DMTFUNLD: USRND01.SBL1.SDSNSAMP
4. JCL library: USRND01.SBL1.JCL
5. REXX EXEC library: USRND01.SBL1.REXX
6. AIX Database Server: yoda13_tr0.stl.ibm.com
7. DB2 UDB for AIX database: DMTDB271 (DB2 for UDB V7.1 fix pack 2)
8. Oracle Server: orac8i (Oracle Version 8.1.6 using Net8)

The data migration tool used the federated database support provided by DB2 UDB V7 and the federated database support for Oracle data sources provided by DB2 Relational Connect. DB2 UDB and Relational Connect were configured for access to Oracle data. The steps included installing Relational Connect and adding an Oracle data source to a federated system, as described in "Setting Up a Federated System to Access Oracle Data Sources" in the chapter "Configuring a Federated Database System" of the DB2 UDB and DB2 Connect Installation and Configuration Supplement.

In order to add Oracle data sources to the federated system, the following steps were performed:

Step 1: Install and configure the Oracle client software on the DB2 federated server using the documentation provided by Oracle. The documentation for this example was from Oracle Version 8.1.6 and Net8.

Step 2: Set data source environment variables by modifying the DB2DJ.ini file and issuing the db2set command. The db2set command updates the DB2 profile registry with the specified settings. The db2dj.ini file was edited to set the ORACLE_HOME, ORACLE_BASE, ORA_NLS, and TNS_ADMIN environment variables, as shown in the Appendix.

Step 3: Insure that the SQL*Net or Net8 tnsnames.ora file is updated for each Oracle server to which communications are configured, and update the tnsnames.ora file for the server yoda13_tr0.stl.ibm.com.

Step 4: Recycle the DB2 instance:

Step 5: Use the CREATE WRAPPER statement to define the wrapper library that will be used to access Oracle data sources. Wrappers are the mechanism that federated servers use to communicate with and retrieve data from data sources.

Step 6: Set the DB2_DJ_COMM environment variable to include the wrapper library that corresponds to the wrapper module created in the previous step.

Step 7: Next, use the CREATE SERVER statement to define each Oracle server to which communications are configured. We created the Oracle server orac8i.

Step 8: If a user ID or password at the federated server was different from a user ID or password at an Oracle data source, use the CREATE USER MAPPING statement to map the local user ID to the user ID and password defined at the Oracle data source. We used the Oracle user ID SYS to access the Oracle data on server orac8i. SYS is one of the DBA users that is created when a database is installed and initialized. The DBA role has all system privileges and the ability to grant all privileges to other users. The Oracle user SYS owns all base tables and user-accessible views of the data dictionary.

Step 9: For Oracle tables in the Oracle data source that do not contain long columns, use the CREATE NICKNAME statement to assign a nickname to the table. Note that the nickname must be the same as the table name specified for the DB2 for OS/390 target table.

Note: Due to schema restrictions, for the tables migrated in this example, Oracle Long data types had to be cast to DB2 UDB for z/OS varchar(length) data types, where length was the max actual length of the data contained in the Oracle Long column.

Step 10. For Oracle tables in an Oracle data source that do contain long columns, use the CREATE NICKNAME statement to assign a nickname to each table located in the Oracle data source and the CREATE VIEW statement to cast the datatype of each long column to varchar. Note that the view name must be the same as the table name specified for the DB2 for OS/390 target table.

Next, it was necessary to modify the configuration for the DB2 UDB Database.

Step 11: Increase the APPLHEAPSZ configuration parameter setting to 1024. The APPLHEAPSZ configuration parameter defines the number of private memory pages available to be used by the database manager on behalf of a specific agent or subagent. The default APPLHEAPSZ value is inadequate for applications that retrieve data from Oracle tables that contain one or more columns having a datatype of long.

To update the database configuration for the target database, we used the DB2 Command Line Processor to set the default application heap parameter (APPLHEAPSZ) for this database to 1024:

Step 12: Next insure that a temporary tablespace exists of adequate size for the transfer of the largest table stored in Oracle.

Configuring DB2 for OS/390

Step 13: Migrate the schema from Oracle to DB2 for OS/390, as shown in the Appendix.

Step 14: Install the source code for DMTFUNLD, the JCL for the precompile, assemble, link edit, and bind of DMTFUNLD, and the UNLOAD and RELOAD REXX EXECs, in your favorite assembler source code, JCL, and REXX libraries.

Step 15: Configure the DB2 for OS/390 Communications Database so that DB2 for OS/390 can function as a DRDA Application Requester to access the remote Oracle server via DB2 UDB, as shown in the Appendix.

This step included inserting a row into the SYSIBM.USERNAMES table with a column TYPE value of "O" for outbound translation, an AUTHID value of blank indicating that translation applies to all authorization ids, a LINKNAME value identical to the SYSIBM.LOCATIONS LINKNAME column value, and a userid and password values respectively for the NEWAUTHID and PASSWORD columns that specify a user ID and password of a user that has the authority to access the Oracle tables via the nicknames and views created above.

While the invention has been described and illustrated with respect to certain preferred embodiments and exemplifications, it is not intended to limit the scope of the invention thereby, but solely by the claims appended hereto.

What is claimed is:

1. A method of migrating data from a database table in a source system to a database table in a target system comprising:
    a. initiating a first batch process and a second batch process on the target system,
    b. the first batch process unloading the data from the source system and uploading the data into the target system, and
    c. the second batch process loading the data from the source system into a database table at the target system,
    wherein, after the second batch process starts, the first batch process streams the unloaded and uploaded data to the second batch process, and the second batch process loads the streamed of data into the database table of the target system.

2. The method of claim 1, further comprising using an SQL "SELECT * FROM tablename" command to unload the data from the source system, where "tablename" is the name of the database table in the source system.

3. The method of claim 1, further comprising using a LOAD utility to load the data into a database table at the target system.

4. The method of claim 1, wherein the first and the second batch processes execute in parallel.

5. The method of claim 1, wherein the database table in the source system and the database table in the target system are relational database tables.

6. The method of claim 1, further comprising generating on the target system control language to submit and execute at least one batch job for transferring the data.

7. The method of claim 1, wherein the first batch process unloads and upload the data only after the second batch process starts.

8. A computer system comprising at least one database management system configured and controlled as a target system and adapted for communication with a second database management system functioning as a source system, said computer system being further configured and controlled to execute two batch processes from the target system,
    a. wherein a first batch process unloads data from a source database table of the source system and uploads the data to the target system, and
    b. wherein a second batch process loads the data into a database table at the target system,
    wherein, after the second batch process starts, the first batch process streams the unloaded and uploaded data to the second batch process, and the second batch process loads the streamed of data into the database table of the target system.

9. The system of claim 8, further comprising using an SQL "SELECT * FROM tablename" command to unload the data from the source system, where "tablename" is the name of the database table in the source system.

10. The system of claim 8, further comprising using a LOAD utility to load the data into the database table at the target system.

11. The system of claim 8, wherein the first and the second batch processes execute in parallel.

12. The system of claim 8, wherein the source database table and the database table at the target system are relational database tables.

13. The system of claim 8, further adapted and controlled to generate on the target system control language to submit and execute at least one batch job for transferring the data.

14. The system of claim 8, wherein the first batch process unloads and upload the data only after the second batch process starts.

15. A program product comprising instructions on a computer readable media, said instructions capable of controlling and configuring a computer to carry out a method of migrating data from a database table in a source system to a database table in a target system and comprising:
    a. initiating a first batch process and a second batch process on the target system,
    b. the first batch process unloading the data from the database table of the source system and uploading the data into the target system, and
    c. second batch process loading the source data into the database table at the target system,
    wherein, after the second batch process starts, the first batch process streams the unloaded and uploaded data to the second batch process, and the second batch process loads the streamed of data into the database table of the target system.

16. The program product of claim 15, wherein the program product further comprises instructions for using an SQL "SELECT * FROM tablename" command to unload the data from the source system, where "tablename" is the name of the database table of the source table.

17. The program product of claim 15, wherein the program product further comprises instructions for using a LOAD utility to load the data into the database table at the target system.

18. The program product of claim 15, wherein the instructions are in the form of code that requires loading to memory for execution.

19. The program product of claim 15 wherein the instructions are in the form of distribution code that requires at least one of decompression and decryption to be executable.

20. The program product of claim 15, wherein the first and second batch processes execute in parallel.

21. The program product of claim 15, wherein the database table in the source system and the database table in the target system are relational database tables.

22. The program product of claim 15, further comprising instructions to generate on the target system control language to submit and execute at least one batch job for transferring the data.

23. The program product of claim 15, wherein the first batch process unloads and upload the data only after the second batch process starts.

\* \* \* \* \*